United States Patent [19]

Sachs et al.

[11] Patent Number: 4,472,230

[45] Date of Patent: Sep. 18, 1984

[54] AQUEOUS POLYISOCYANATE EMULSIONS USEFUL AS BINDERS IN THE PRODUCTION OF MOLDED ARTICLES

[75] Inventors: Hanns I. Sachs; Peter Kasperek; Robert Peters, all of Cologne, Fed. Rep. of Germany

[73] Assignee: Bayer Aktiengesellschaft, Leverkusen, Fed. Rep. of Germany

[21] Appl. No.: 455,376

[22] Filed: Jan. 3, 1983

[30] Foreign Application Priority Data

Jan. 15, 1982 [DE] Fed. Rep. of Germany ....... 3201111

[51] Int. Cl.³ .......................... C09J 5/02; C08G 18/70
[52] U.S. Cl. .................................. 156/307.3; 156/313; 156/331.4; 252/182; 252/184; 521/78; 521/109.1; 521/137; 528/67
[58] Field of Search .......................... 521/78, 109, 137; 528/67; 156/307.3, 313, 331.4; 252/182, 184

[56] References Cited

U.S. PATENT DOCUMENTS 3,317,481 5/1967 Youker .............................. 260/77.5
4,260,532 4/1981 Reuther et al. ............. 260/29.6 HN

FOREIGN PATENT DOCUMENTS 13112 7/1980 European Pat. Off. .
1653177 11/1970 Fed. Rep. of Germany .
2703271 8/1978 Fed. Rep. of Germany .
2832509 1/1980 Fed. Rep. of Germany .
2921681 12/1980 Fed. Rep. of Germany .
2921726 12/1980 Fed. Rep. of Germany .
2948015 6/1981 Fed. Rep. of Germany .
1148016 4/1969 United Kingdom .
1523601 9/1978 United Kingdom .

OTHER PUBLICATIONS

Sachs, 1977, Holz-Zentralblatt No. 20, pp. 295-296.

*Primary Examiner*—Herbert S. Cockeram
*Attorney, Agent, or Firm*—Gene Harsh; Joseph C. Gil; Lyndanne M. Whalen

[57] ABSTRACT

Aqueous polyisocyanate emulsions are made by emulsifying 5 to 70 parts by weight (on a basis of 100 parts) of a polyisocyanate which has not been modified to render it hydrophilic and emulsifiable with 30 to 95 parts by weight (on a basis of 100 parts) aqueous paraffin dispersion containing 3 to 65 wt. % paraffin, and optionally known additives in the presence of water. The water is used in a quantity such that the emulsion has a solids content of from 6 to 90 wt. %. These emulsions are particularly useful as binders in the production of molded articles.

18 Claims, No Drawings

AQUEOUS POLYISOCYANATE EMULSIONS USEFUL AS BINDERS IN THE PRODUCTION OF MOLDED ARTICLES

BACKGROUND OF THE INVENTION

This invention relates to aqueous polyisocyanate emulsions useful as binders in the production of molded articles, particularly boards of materials containing lignocellulose.

Molded articles such as chipboard, composite board and the like are generally produced by hot molding an inorganic or organic raw material (e.g. a mass of wood shavings, wood fibers or other material containing lignocellulose) together with binders (e.g. aqueous dispersions or solutions of urea formaldehyde or phenol formaldehyde resins). It is known to use isocyanate solutions instead of urea formaldehyde or phenol formaldehyde resins as binders for molded board (German Auslegeschrift No. 1,271,984, German Offenlegungsschrift No. 1,653,177).

In these hot molding processes (particularly in the manufacture of wood chipboards) it is generally necessary under the standard regulations of the building trade (e.g. DIN No. 68 763) to add hydrophobicizing agents separately. In practice, such agents are usually in the form of aqueous paraffin dispersions because it is believed to be impossible to mix these agents with unmodified polyisocyanates (Sachs, 1977, Holz-Zentralblatt No. 20, page 295/296; Ball/Redman, 1979, Holz-Zentralblatt No. 88, page 1291). Use of isocyanates for the manufacture of chipboard is thereby rendered much more difficult.

Another known process for the manufacture of boards or molded articles is hot molding a mixture of lignocellulose material and an aqueous emulsion of an organic polyisocyanates as binder (German Offenlegungsschriften Nos. 2,610,552 and 2,703,271). In this process, the aqueous paraffin dispersions required for the manufacture of wood chipboard may be applied separately or in admixture with a previously prepared aqueous isocyanate emulsion (Ball/Redman 1979, Holz-Zentralblatt No. 88, page 1291; German Offenlegungsschrift 2,948,015). However, these aqueous emulsions have the serious disadvantage that expensive isocyanate modification processes are required to render the emulsion hydrophilic and emulsifiable. In some cases the necessary emulsifiers are expensive and they increase the cost of the binders by 20 to 30% making such isocyanate binders less competitive economically with conventional binders. Additionally, isocyanates which have been modified to render them emulsifiable (see German Auslegeschriften Nos. 2,921,681; 2,921,726, 2,610,552 and 2,703,271 and the literature cited therein) give rise to storage problems of both the products themselves and the glue-covered chips.

SUMMARY OF THE INVENTION

It is an object of the present invention to provide aqueous polyisocyanate emulsions.

It is also an object of the present invention to provide aqueous emulsions of polyisocyanates which polyisocyanates have not been hydrophilically modified.

It is another object of the present invention to provide aqueous emulsions useful in the production of molded articles by hot molding processes.

It is yet another object of the present invention to provide an aqueous emulsion which is simple to make and use, has reduced reactivity with water and is economical.

These and other objects which will be apparent to those skilled in the art are accomplished by an aqueous emulsion made from (a) 5–70 parts by weight emulsifier-free polyisocyanate which polyisocyanate has not been modified to render it hydrophilic and emulsifiable and (b) 30–95 parts by weight aqueous paraffin dispersion having a paraffin content of from 3 to 65 wt. % in a quantity of water such that the emulsion has a solids content of from 6 to 90 wt. %.

DETAILED DESCRIPTION OF THE INVENTION

The present invention relates to aqueous emulsions of organic polyisocyanates, aqueous paraffin dispersions and optionally additional water. These emulsions are made by emulsifying (a) from 5 to 70 parts by weight (preferably from 10 to 60 parts by weight) of an emulsifier-free polyisocyanate which has not been modified to render it hydrophilic and emulsifiable and (b) from 30 to 95 parts by weight (preferably from 40 to 90 parts by weight), of an aqueous paraffin dispersion containing from 3 to 65 wt. % of paraffin, and optionally the usual additives in the usual quantities in water without the addition of emulsifier. The quantity of water employed is calculated to provide an emulsion having a solids content (composed of (a) plus (b)) of from 6 to 90 wt. %, preferably from 10 to 70 wt. %.

The present invention also relates to the use of these polyisocyanate emulsions as binders in the production of molded articles by hot molding a mass of size reduced organic and/or inorganic raw materials.

The emulsions of the present invention may be prepared, for example, by mixing the polyisocyanate with the paraffin dispersion, optionally further diluted with water.

Examples of suitable paraffin dispersions include the dispersions obtained according to German Offenlegungsschrift No. 2,948,015 by the dispersion of paraffins in the presence of dispersing agents based on cationic polyelectrolytes. The dispersions disclosed in U.S. Pat. Nos. 2,655,496 and 3,965,032 or similar products of Mobil Oil (such as Mobilcer-A-331 or Mobil Oil experimental product ED 80/196 (see G. W. Ball et al, Holz-Zentralblatt No. 88 of 23rd July, 1979; or H. I. Sachs, Holz-Zentralblatt 103, No. 20, pages 295–296, and No. 25, pages 384–388 (1977)) may also be used.

The aqueous emulsions may be produced in industrial plants by mixing the starting components in special mixing apparatus, such as static mixers; stirrers with mixing heads; Inline-Ultra-Turrax apparatus (as fabricated by Janke and Kunkel, D-7812, Bad Krotzingen-2,) by high pressure mixing heads or high pressure injection inoculation blocks.

The emulsions of the present invention may be prepared and processed either batchwise or continuously. Continuous processes are preferred due to their increased reliability in production.

The isocyanate components used in the preparation of the emulsions of the present invention may be aliphatic, cycloaliphatic, araliphatic, aromatic or heterocyclic polyisocyanates such as those described, for example, by W. Siefken in Justus Liebigs Annalen der Chemie, 562, pages 75 to 136. Suitable isocyanates include those corresponding to the formula $$Q(NCO)_n$$

in which n represents 2 to 4, preferably 2, and

Q represents an aliphatic hydrocarbon group having 2 to 18 (preferably 6 to 10) carbon atoms, a cycloaliphatic hydrocarbon group having 4 to 23 (preferably 5 to 13) carbon atoms, an aromatic hydrocarbon group having 6 to 23 (preferably 6 to 13) carbon atoms, or an araliphatic hydrocarbon group having 8 to 15 (preferably 8 to 13) carbon atoms.

Specific examples of such isocyanates are: 1,4-tetramethylene diisocyanate, 1,6-hexamethylene diisocyanate, 1,12-dodecane diisocyanate, cyclobutane-1,3-diisocyanate, cyclohexane-1,3- and -1,4-diisocyanate and mixtures of these isomers; 1-isocyanato-3,3,5-trimethyl-5-isocyanatomethyl-cyclohexane (DE-B 1,202,785, U.S. Pat. No. 3,401,190), 2,4- and 2,6-hexahydro-tolylene diisocyanate and mixtures of these isomers; hexahydro-1,3- and/or 1,4-phenylene diisocyanate, perhydro-2,4'- and/or 4,4'-diphenylmethane diisocyanate, 1,3- and 1,4-phenylene diisocyanate, 2,4- and 2,6-tolylene diisocyanate and mixtures of these isomers; diphenylmethane-2,4' and/or 4,4'-diisocyanate, and naphthylene-1,5-diisocyanate.

The following may also be used in the present invention: triphenylmethane-4,4',4"-triisocyanate; polyphenyl-polymethylene-polyisocyanates which may be obtained by aniline-formaldehyde condensation followed by phosgenation (described, for example in British Pat. Nos. 874,430 and 848,671); m- and p-isocyanatophenyl sulfonyl isocyanates (U.S. Pat. No. 3,454,606); perchlorinated arylpolyisocyanate (described, for example, in German Auslegeschrift No. 1,157,601 (U.S. Pat. No. 3,277,138)); polyisocyanates containing carbodiimide groups (described in German Pat. No. 1,092,007 (U.S. Pat. No. 3,152,162) and in German Offenlegungsschriften Nos. 2,504,400, 2,537,685 and 2,552,350); norbornane diisocyanates (U.S. Pat. No. 3,492,330); polyisocyanates containing allophanate groups (described in British Pat. No. 994,890, Belgian Pat. No. 761,626 and Netherlands Patent Specification No. 7,102,524); polyisocyanates containing isocyanurate groups (described in U.S. Pat. No. 3,001,973, German Pat. Nos. 1,022,789; 1,222,067 and 1,027,394 and in German Offenlegungsschriften Nos. 1,929,034 and 2,004,048); polyisocyanates containing urethane groups (described in Belgian Pat. No. 752,261 or in U.S. Pat. Nos. 3,394,164 and 3,644,457); polyisocyanates containing acylated urea groups (German Pat. No. 1,230,778); polyisocyanates containing biuret groups (described in U.S. Pat. Nos. 3,124,605; 3,201,372 and in British Pat. No. 889,040); polyisocyanates prepared by telomerization reactions (U.S. Pat. No. 3,654,106); polyisocyanates containing ester groups (British Pat. Nos. 965,474 and 1,077,956, U.S. Pat. No. 3,567,763 and German Pat. No. 1,231,688); reaction products of the above-mentioned isocyanates with acetals (German Pat. No. 1,072,385) and polyisocyanates containing polymeric fatty acid esters (U.S. Pat. No. 3,455,883). Any mixture of the above-mentioned polyisocyanates may also be used.

It is generally preferred to use the commercially readily available polyisocyanates, such as 2,4- and 2,6-tolylene diisocyanate and any mixtures of these isomers ("TDI"); polyphenyl-polymethylene polyisocyanates as prepared by aniline-formaldehyde condensation followed by phosgenation ("crude MDI"); and polyisocyanates containing carbodiimide groups, urethane groups, allophanate groups, isocyanurate groups, urea groups, biuret groups or other groups used in isocyanate chemistry ("modified polyisocyanates"). Those modified polyisocyanates which are derived from 2,4- and/or 2,6-tolylene diisocyanate or from 4,4'- and/or 2,4'- and/or 2,2'-diphenylmethane diisocyanate are particularly preferred.

Prepolymers with an average molecular weight of about 300 to 2000 containing isocyanate end groups, such as those obtained in known manner by reacting relatively high molecular weight and/or low molecular weight polyols with an excess of polyisocyanate, may also be used in preparing the emulsion of the present invention. Relatively high molecular weight polyols which are particularly suitable for making such prepolymers are compounds having from 2 to 8 hydroxyl groups, especially those with molecular weights from 400 to 10,000 (preferably from 800 to 5000). Such polyols include polyesters, polyethers, polythioethers, polyacetals, polycarbonates and polyester amides having at least two, generally two to eight, preferably two to four hydroxyl groups, which are known to be useful in the production of both homogeneous and cellular polyurethanes.

Suitable polyesters containing hydroxyl groups include the reaction products of polyhydric (preferably dihydric) alcohols, optionally with the addition of trihydric alcohols, and polybasic (preferably dibasic) carboxylic acids. Instead of free polycarboxylic acids, the corresponding polycarboxylic acid anhydrides or corresponding polycarboxylic acid esters of lower alcohols or mixtures thereof may also be used in the preparation of the polyesters. The polycarboxylic acids may be aliphatic, cycloaliphatic, aromatic and/or heterocyclic and they may be substituted (e.g. with halogen atoms), and/or unsaturated.

The following are specific examples of carboxylic acids and derivatives which may be used to prepare the polyesters: succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimerized and trimerized unsaturated fatty acids optionally mixed with monomeric unsaturated fatty acids (such as oleic acid); dimethylterephthalate and terephthalic acid-bisglycol esters. Examples of suitable polyhydric alcohols include: ethylene glycol, (1,2)- and (1,3)-propylene glycol, (1,4)- and (2,3)-butylene glycol, (1,6)-hexanediol, (1,8)-octanediol, neopentyl glycol, 1,4-bis-hydroxymethylcyclohexane, 2-methyl-1,3-propanediol, glycerol, trimethylolpropane, (1,2,6)-hexanetriol, (1,2,4)-butanetriol, trimethylolethane, pentaerythritol, quinitol, mannitol and sorbitol, formitol, methyl glycoside, di-, tri-, tetra- and higher polyethylene glycols, di-, tri-, tetra- and higher polypropylene glycols and di-, tri- and tetra- and higher polybutylene glycols. The polyesters may contain a proportion of carboxyl end groups. Polyesters of lactones, e.g. of ε-caprolactone, or of hydroxycarboxylic acids, e.g. of ω-hydroxycaproic acid, may also be used.

The polyethers which may be used in the present invention contain at least two, generally two to eight, preferably two to three hydroxyl groups. These polyethers may be prepared by the polymerization of epoxides such as ethylene oxide, propylene oxide, butylene oxide, tetrahydrofuran, styrene oxide or epichlorohydrin, either on their own in the presence of Lewis catalysts such as BF$_3$, or by chemical addition of these epoxides (preferably ethylene oxide and propylene oxide, optionally as mixtures or successively) to starting components which have reactive hydrogen atoms. Appropriate starting components are water, alcohols, ammonia or amines. Specific examples of such starting components are ethylene glycol, (1,3)- or (1,2)-propylene glycol, trimethylolpropane, glycerol, sorbitol, 4,4'-dihydroxydiphenylpropane, aniline, ethanolamine or ethylene diamine. Sucrose polyethers such as those described in German Auslegeschriften 1,176,358 and 1,064,938 and polyethers started on formitol or formose (German Offenlegungsschriften No. 2,639,083 and 2,737,951) may also be used. It is in many cases preferred to use polyethers containing predominantly primary OH groups (up to 90% weight % thereof, based on all the OH groups present in the polyether). Polybutadienes containing OH groups are also suitable to the present invention.

Suitable polythioethers include the condensation products of thiodiglycol obtained by reacting the thiodiglycol on its own and/or with other glycols, dicarboxylic acids, formaldehyde, aminocarboxylic acids or amino alcohols. The products thus obtained may be, for example, mixed polythio ethers, polythio ether esters, or polythio ether ester amides, depending upon the co-components.

Suitable polyacetals include those prepared from glycols such as diethylene glycol, triethylene glycol, 4,4'-dioxethoxydiphenyldimethylmethane, hexanediol and formaldehyde. Polyacetals suitable for purposes of the present invention may also be prepared by the polymerization of cyclic acetals such as trioxane (German Offenlegungsschrift 1,694,128).

The polycarbonates with hydroxyl groups which may be used in the present invention are known to those in the art. Such polycarbonates may be prepared, for example, by the reaction of diols such as (1,3)-propane diol, (1,4)-butanediol and/or (1,6)-hexanediol, di-, tri- or tetra-ethylene glycol or thiodiglycol with diarylcarbonates (e.g. diphenylcarbonate) or phosgene (German Auslegeschriften Nos. 1,694,080; 1,915,908 and 2,221,751 and German Offenlegungsschrift 2,605,024).

Polyester amides and polyamides which may be used in the practice of the present invention include e.g. the predominantly linear condensates obtained from polyvalent saturated or unsaturated carboxylic acids or their anhydrides and polyvalent saturated or unsaturated amino alcohols, diamines, polyamines or mixtures thereof.

Polyhydroxyl compounds which already contain urethane or urea groups and modified or unmodified natural polyols such as castor oil or carbohydrates (e.g. starch) may also be used in the present invention. Addition products of alkylene oxides with phenol formaldehyde resins or with urea formaldehyde resins are also suitable to the present invention.

Suitable low molecular weight polyols (molecular weight from 62 to 399) include, for example, the compounds mentioned above as starting components for the preparation of relatively high molecular weight polyols.

Catalysts may also be used in practicing the present invention. Suitable catalysts include those of known type such as tertiary amines. Specific examples of appropriate catalysts are: triethylamine, tributylamine, N-methylmorpholine, N-ethylmorpholine, N-cocomorpholine, N,N,N',N'-tetramethyl-ethylenediamine, 1,4-diaza-bicyclo-(2,2,2)-octane, N-methyl-N'-dimethylaminoethylpiperazine, N,N-dimethylbenzylamine, bis-(N,N-diethylaminoethyl)-adipate, N,N-diethylbenzylamine, pentamethyl-diethylenetriamine, N,N-dimethylcyclohexylamine, N,N,N',N'-tetramethyl-1,3-butane diamine, N,N-dimethyl-$\beta$-phenylethylamine, 1,2-dimethylimidazole and 2-methylimidazole. The catalysts used may also be known Mannich bases of secondary amines such as dimethylamine and aldehydes (preferably formaldehyde) or ketones (such as acetone, methyl ethyl ketone or cyclohexanone), and phenols (such as phenol, nonylphenyl or bisphenol). Examples of other tertiary amines with isocyanate reactive hydrogen atoms used as catalysts include triethanolamine, triisopropanolamine, N-methyldiethanolamine, N-ethyl-diethanolamine, N,N-dimethylethanolamine and their reaction products with alkylene oxides such as propylene oxide and/or ethylene oxide.

Silaamines having carbon-silicon bonds as described e.g. in German Pat. No. 1,229,290 (corresponding to U.S. Pat. No. 3,620,984) may also be used as catalysts. Specific examples of such compounds are 2,2,4-trimethyl-2-silamorpholine and 1,3-diethylaminomethyl-tetramethyl-disiloxane.

The catalysts used may also be bases containing nitrogen (such as tetralkylammonium hydroxides) or alkali metal hydroxides (such as sodium hydroxide), alkali metal phenolates (such as sodium phenolate) or alkali metal alcoholates (such as sodium methylate). Hexahydrotriazines may also be used as catalysts. Organic metal compounds, particularly organic tin compounds may also be used as catalysts. The preferred organic tin compounds are tin-(II) salts of carboxylic acids such as tin-(II) acetate, tin-(II) octoate, tin-(II)-ethyl hexoate and tin-(II)-laurate and tin-(IV) compounds such as dibutyl tin oxide, dibutyl tin dichloride, dibutyl tin diacetate, dibutyl tin dilaurate, dibutyl tin maleate and dioctyl tin diacetate. Mixtures of any of the above-mentioned catalysts may, of course, also be used.

Additional representatives of catalysts which may be used in the present invention and the mode of action of the catalysts are described in Kunststoff-Handbuch, Volume VII, published by Vieweg and Hochtlen, Carl-Hanser-Verlag, Munich 1966, e.g. on pages 96 to 102.

The emulsions of the present invention are preferably used as binders for materials containing lignocellulose. Emulsions which have proved particularly suitable for this purpose are those in which the polyisocyanate component is the phosgenation product of the undistilled ground fraction which may be obtained by the removal of 25 to 90 wt. % (preferably 30 to 98 wt. %) of 2,2'-, 2,4'- and/or 4,4'-diaminodiphenylmethane from an aniline/formaldehyde condensate. Another particularly desirable polyisocyanate component is the undistilled ground fraction obtained by removal of from 25 to 90 wt. % (preferably from 30 to 85 wt. %) of 2,2'-, 2,4'- and/or 4,4'-diisocyanatodiphenylmethane from the crude phosgenation product of an aniline/formaldehyde condensate. In either of these polyisocyanates, the isocyanate component should generally contain from 35 to 70 wt. % (preferably from 45 to 60 wt. %) of diisocyanatodiphenylmethane, the 2,4'-diisocyanatodiphenylmethane content should amount to from 1 to 8 wt. % (preferably from 2 to 5 wt. %) while the 2,2'-diisocyanatodiphenylmethane content should preferably be from 0 to 2 wt. %. The isocyanate component should generally have a viscosity at 25° C. of from 50 to 600 mPas, (preferably from 200 to 500 mPas) and an isocyanate content of from 28 to 32 wt. % (see German Auslegeschrift No. 2,711,958).

Such ground fractions may be obtained, for example, when from 45 to 90 wt. % (preferably from 55 to 85 wt. %) of 4,4'-diisocyanatodiphenylamine is removed from a crude diphenylmethane diisocyanate containing more than 85 wt. % (preferably more than 90 wt. %) of 4,4'-diisocyanatodiphenylmethane. A crude diphenylmethane diisocyanate of this kind may be obtained, for example, by the process according to German Offenlegungsschrift No. 2,356,828.

Another possible method for making suitable ground fractions is by distilling off 25 to 80 wt. % (preferably 30 to 60 wt. %) of 2,4-diisocyanatodiphenylmethane and optionally 4,4'- or 2,2'-diisocyanatodiphenylmethane from a crude phosgenation product containing from 60 to 90 wt. % (preferably from 65 to 75 wt. %) of diisocyanatodiphenylmethane isomers and having from 20 to 60 wt. % (preferably from 30 to 40 wt. %) of 2,4'-isomers. Distillation may be carried out in a manner such that the residue has the composition indicated above.

It is of course possible (and in many cases simpler in practice) to obtain the desired composition of isomers and oligomers in the polyisocyanate mixture by blending various ground fractions.

In addition to the preferred unmodified polyisocyanates, polyisocyanates modified to be self-releasing from the mold may also be mixed with the paraffin dispersions. Such polyisocyanates which have been modified to be self-releasing from the mold have been described, for example, in German Offenlegungsschrift 3,109,317 (U.S. Pat. No. 4,258,169), German Offenlegungsschrift No. 2,932,175 (U.S. Pat. No. 4,257,995) and U.S. Pat. No. 4,257,996. These disclosed polyisocyanates are modified with phosphorus compounds. The modification of polyisocyanates with from 0.1 to 30 wt. % of phosphoric acid-$C_1$–$C_7$-dialkylesters (preferably phosphoric acid-di-n-butylester) is described in German Patent Application P No. 31 08 538. In accordance with the present invention, these modified polyisocyanates are mixed with the paraffin dispersion without the addition of emulsifier.

Suitable lignocellulose-containing raw materials which may be bound with the emulsions of the present invention include wood, tree bark, cork, bagasse, straw, flax, bamboo, alfalfa grass, rice husks, sisal fibers and coconut fibers. These raw materials may be in the form of granules, chips, fibers or powders and may have a water content of from 0 to 35 wt. % (preferably from 5 to 25 wt. %). In accordance with the present invention, the binder is added to the lignocellulose-containing raw material in a quantity of from 1 to 100 wt. % (preferably from 2 to 12 wt. %) and molded generally with the application of heat and pressure to form boards or shaped products.

Molded products may, of course, also be produced in accordance with the present invention from other organic (e.g. plastic waste of all kinds) and/or inorganic raw materials (e.g. expanded mica or silicate pellets).

When the emulsion of the present invention is used, the material which is to be molded is mixed with the binder, preferably by spraying it with the aqueous emulsion in order to obtain very homogeneous distribution. It has been found that the aqueous emulsions of the present invention have a sufficiently low viscosity to enable them to be sprayed even when they have an isocyanate content of up to 70%. The solutions of urea/formaldehyde and phenol/formaldehyde resins conventionally used in the manufacture of molded board and similar materials can, however, generally be sprayed only if the solid content is below 40%. The present invention thus provides a method in which less water is used than was previously possible so that less water need be removed during the stage of hot molding and/or subsequent conditioning. Further, the lignocellulose materials need not be dried as extensively before being mixed with the binder as is required in known processes.

Since the polyisocyanates employed in the present invention have not been modified to render them hydrophilic and they contain no added emulsifiers, the wood chip board obtained therefrom has the lowest possible absorption of water so that the tendency to swell upon contact with water is significantly reduced.

Periods of delay may occur between the individual stages of the process (preparation of the emulsion, spraying of the material to be used). Delays may also occur due to mechanical difficulties or the need to readjust the operating conditions. However, the reaction between the isocyanate and water in the emulsions of the present invention proceed at a rate sufficiently slow to permit delays of 2 hours or more between preparation of the emulsion and hot molding without significantly affecting the product. The velocity of the reaction may be reduced by altering the reactivity of the polyisocyanates with water. The reaction velocity may, for example, be considerably reduced by increasing the proportion of 2,4'- and/or 2,2'-diphenylmethane diisocyanate.

Multilayered boards or articles composed of veneers, paper or fabric may be produced in a manner analogous to that for production of molded board. Multilayered boards or shaped articles composed of veneers and middle layers of strips and bars or small rods, (so-called joiner boards) may be produced in accordance with the present invention by treating the veneers with the polyisocyanate emulsions as described above and then pressing these veneers to the middle layers, generally at elevated temperatures and pressures. Temperatures of from 100° to 250° C. are generally advantageous in such treatments with temperatures from 130° to 220° C. being particularly useful. The initial molding pressure employed should preferably be from 5 to 150 bar with the pressure in most cases falling towards zero during the course of the molding process.

In accordance with the present invention, the polyisocyanate emulsions may also be used in combination with the polyhydroxyl compounds described above in an NCO/OH ratio ranging from 1:2 to 10:1, preferably from 1.5:1 to 1:1. The two components may be used either separately or as a reactive mixture. Such combinations of polyisocyanates and polyhydroxyl compounds are of practical importance as binders, e.g. for binding granulated cork. Known blowing agents may also be used in a quantity of ca. 0.5 to 30 wt. %, based on the binder or impregnating agent. In addition or alternatively, additives which influence foaming or the chemical reaction between polyisocyanates, lignocellulose-containing material and, if used, polyhydroxyl compounds may also be employed. Examples of such additives are stabilizers, catalysts and activators. Such additives, if used, should generally be used in a quantity of from 0.05 to 10 wt. % based on the binder or impregnating agent.

The polyisocyanate emulsions to be used as binders in the practice of the present invention may also be combined with aqueous solutions of the condensation products of formaldehyde with urea and/or melamine and/or phenol, which have been used predominantly in the woodworking industry. the emulsions may also be combined with other less commonly used binders and impregnating agents, such as sulphite waste liquors (lignin sulphonate or other industrial lignin solutions obtained from the processing of wood) or tanning substances (such as tannin), in a quantity such that the proportion of the binder of the present invention to the additional binders is in the range of from 1:10 to 10:1, preferably from 1:5 to 5:1. The polyisocyanate emulsion and the additional binder may be used separately or as mixtures.

Such emulsion-binder combinations are particularly advantageous for the manufacture of multilayered boards which have special properties. For example, the outer layers may be treated with conventional adhesives (alone or together with the polyisocyanate emulsion of the present invention) while one or more inner layers are treated with the polyisocyanate emulsions of the present invention (alone or together with conventional adhesives) and the layers may subsequently be pressed together.

The boards or molded articles based on lignocellulose-containing other organic and/or inorganic raw materials produced in accordance with the present invention are particularly suitable for use in the building industry because of their excellent mechanical properties. In order to impart to these boards or molded articles the necessary resistance to mold, insects, or fire, the usual commercial additives (such as organic or inorganic protective agents) may be added to the binders or raw materials, either neat or as solutions. These additives are generally used in a quantity of about 0.05 to 30 wt. %, preferably 0.5 to 20 wt. %, based on the entire quantity of material. Solvents which may be used in the present invention include water and organic solvents such as residual oils from the petroleum industry, chlorinated hydrocarbons, etc. These solvents generally do not impair adhesive quality. In contrast to boards glued with phenol/formaldehyde resin, the materials produced in accordance with the present invention have the advantage that neither efflorescence of salt nor "bleeding" occurs.

Due to the powerful adhesive force of the binders of the present invention, molded products impregnated or bonded with these binders have a tendency to adhere to the surfaces of the hot presses or molds. This problem may be avoided by the addition of mold release agents to the isocyanate emulsions. Another solution to the adhesive problem is application of the mold release agents either neat or as solutions to the metallic surfaces which come into contact with the moldings or to the surface of the molding. The mold release agents used may be any of the substances known to the suitable for this purpose although it is preferred to use the compounds according to German Offenlegungsschrift 2,325,926 which catalyze the formation of isocyanurates from isocyanates. Examples of such mold release agents include phenol Mannich bases, derivatives of hexahydrotriazine and alkali metal salts of carboxylic acids. Another method of preventing adherence to the surface of the molds is provision of a separating layer between the molding and the metallic surfaces of the mold. This separating layer may consist of webs, foils or size reduced material made of various substances (e.g. plastics, paper, wood or metal).

As mentioned above, the isocyanate emulsions of the present invention may provide substantial improvements in the manufacture of chipboard as compared to conventional binders based on phenol/formaldehyde or urea/formaldehyde resins, both in the mechanical properties of the product and with respect to processing considerations. Thus, in the case of wood chipboard, when the binder of the present invention is used in the same quantity as the phenol/formaldehyde or urea/formaldehyde resins conventionally used may provide an increase in flexural strength by up to 50% (in addition to an improvement in other mechanical properties). The same mechanical properties as those obtained with conventional phenol/formaldehyde or urea/formaldehyde resins may be obtained using the binder of the present invention in concentrations from 25 to 70% less than that of the conventional binder. These optimum material properties are obtained, for example, when the binder used is a polymethylenepolyphenylpolyisocyanate having the viscosity and distribution of isomers required in the present invention.

It is immaterial whether the polyisocyanate mixture was obtained from crude diphenylmethane diisocyanate by distilling off the 2,4'- and/or 4,4'-diisocyanatodiphenylmethane or by the removal of pure diaminodiphenylmethane from crude diaminodiphenylmethane, followed by phosgenation of the resulting undistilled ground fraction of polyarylamines.

If the polyisocyanate contains more than 75 wt. % of diisocyanatodiphenylmethane, the physical properties of the chipboard produced therefrom generally deteriorate. If, on the other hand, the diisocyanatodiphenylmethane content falls below 35 wt. %, the binder generally becomes too highly viscous at room temperature and will be difficult to emulsify.

The following Examples illustrate the present invention. Numerical data are to be understood as parts by weight or percentages by weight unless otherwise indicated.

EXAMPLES

EXAMPLE 1

An 8% paraffin dispersion was prepared from 22 parts of a 65% aqueous paraffin dispersion (Trade product Mobilcer 739 (Mobil Oil-AG)) and 158 parts of water, by stirring the ingredients together. 55 parts of polyisocyanate A of German Offenlegungsschrift No. 2,711,958 were emulsified in this mixture within 30 seconds by means of a high speed stirrer.

2900 Parts of industrially produced coniferous wood chips having a moisture content of 5% were then sprayed with the emulsion in a laboratory sizing machine, using two-material eddy stream nozzles. A molding was produced from these chips on a steel plate which had previously been treated with an aqueous potassium acetate/diethylene glycol solution. The surface of the molding had also been wetted with a solution of mold release agent. After a molding time of 3.2 minutes at a hotplate temperature of 170° C. and at a molding pressure of 25 bar (which was reduced to 5 bar after ⅓ of the molding time), a chipboard having a transverse tensile strength of 0.76 mPa was obtained.

EXAMPLE 2

An emulsion was prepared from 63 parts of a 35% aqueous paraffin dispersion (Trade product Mobilcer ED 80/229) and 126 parts of polyisocyanate B of German Offenlegungsschrift No. 2,711,958 by the inoculation block technique.

189 Parts of the emulsion were then added to 2250 parts of middle layer chips consisting of a mixture of coniferous wood and hardwood and having a moisture content of 7%. 980 Parts of coniferous wood top layer chips having a moisture content of 9% were then wetted with 240 parts of a commercial weakly alkaline 45% phenol/formaldehyde resin. (Bakelite-2501; sold by Bakelith GmbH, D-5860, Iserlohn-7)

Three-layered moldings were formed and a middle layer bonded with phenol/formaldehyde resin and a middle layer bonded with isocyanate emulsion, and the layers were pressed at a hotplate temperature of 170° C.

The resulting chipboards of standard type V 100 according to DIN 68 763 had a V 100 transverse tensile strength of 0.24 mPa and a thickness swelling after 24 hours storage in water of 10.5%.

EXAMPLE 3

An emulsion was prepared from 143 parts of water, 17 parts of potassium bifluoride (®Basilit SP of Desowag-Bayer-Holzschutz GmbH), 29 parts of a 50% paraffin dispersion (®Mobilcer 161 of Mobile Oil-AG) and 143 parts of polyisocyanate C of German Offenlegungsschrift No. 2,711,958 by means of a high pressure mixing head. This emulsion was used to wet 2950 parts of an industrially produced wood chip mixture of 50% coniferous wood and 50% hard wood having a moisture content of 5%. These chips were placed between two pinewood veneers 1.5 mm thick as top layers to produce a molding which was then hardened as described in Example 1. The decorative, mold resistant chipboard obtained had high flexural strength in the direction of the fibers of the veneers, a V 20 transverse tensile strength of 1.08 mPa and a V 100 transverse tensile strength of 0.24 mPa.

What is claimed is:

1. An aqueous emulsion comprising:
   (a) 5-70 parts by weight emulsifier-free polyisocyanate which polyisocyanate has not been modified to render it hydrophilic and emulsifiable and
   (b) 30-95 parts by weight aqueous paraffin dispersion said dispersion having a paraffin content from 3 to 65 wt. %
in a quantity of water such that the emulsion has a solids content of from 6 to 90 wt. %.

2. The emulsion of claim 1 further comprising a stabilizer and/or catalyst and/or activator.

3. The emulsion of claim 1 wherein the polyisocyanate (a) is (i) the phosgenation product of an undistilled ground fraction of 25-90 wt. % of 2,2'-, 2,4'- and/or 4,4'-diaminodiphenylmethane produced from an aniline/formaldehyde condensate or (ii) an undistilled ground fraction of 25-90 wt. % of 2,2'-, 2,4'- and/or 4,4'-diisocyanatodiphenylmethane made from a crude phosgenation product of an aniline/formaldehyde condensate said polyisocyanate (a) containing from 35-70 wt. % diisocyanatodiphenylmethane having a viscosity at 25° C. of from 50 to 600 mPas and an isocyanate content of from 28-32 wt. %.

4. The emulsion of claim 3 wherein the diisocyanatodiphenylmethanes include from 1 to 8 wt. % of 2,4'-diisocyanatodiphenylmethane and from 0 to 2 wt. % of 2,2'-diisocyanatodiphenylmethane.

5. The emulsion of claim 1 wherein the polyisocyanate (a) is obtained as a ground fraction by removing 45-90 wt. % of 4,4'-diphenylmethane diisocyanate by distillation from a crude diphenylmethane diisocyanate containing more than 85 wt. % diphenylmethane diisocyanate.

6. The emulsion of claim 1 wherein the polyisocyanate (a) is obtained by phosgenation of an undistilled ground fraction remaining after 45-90 wt. % of 4,4'-diaminodiphenylmethane has been distilled off from crude diaminodiphenylmethane containing more than 85 wt. % pure diaminodiphenylmethane.

7. The emulsion of claim 1 wherein the polyisocyanate (a) is that obtained by distilling off 25-80 wt. % of 2,4'- and/or 4,4'-diisocyanatodiphenylmethane from a crude diphenylmethane diisocyanate containing from 60 to 90 wt. % diisocyanatodiphenylmethane isomers in which 20 to 60 wt. % is 2,4'-isomers.

8. The emulsion of claim 1 wherein the polyisocyanate (a) has been prepared by phosgenation of an undistilled ground fraction obtained by removal by distillation of 25-80 wt. % 2,4'-diaminodiphenylmethane and optionally 4,4'-diaminodiphenylmethane from a crude diaminodiphenylmethane containing 60-90 wt. % pure diaminodiphenylmethane which pure diaminodiphenylmethane contains 20-60 wt. % 2,4'-diaminodiphenylmethane.

9. A process for the production of molded articles comprising:
   (a) mixing a mass of size reduced organic and/or inorganic raw materials with the aqueous emulsion of claim 1 which acts as a binder and
   (b) molding the mixture of (a) by applying heat and pressure to form a board or shaped product.

10. The process of claim 9 wherein the binder emulsion comprises from 1 to 100 wt. % organic and/or inorganic raw materials.

11. The process of claim 9 wherein the binder emulsion additionally contains a polyol in quantities such that the NCO/OH ratio is in the range of from 1:2 to 10:1.

12. The process of claim 11 wherein the emulsion contains a blowing agent.

13. The process of claim 11 wherein the emulsion contains from 0.01 to 10 wt. % catalyst.

14. The process of claim 9 wherein the emulsion contains from 0.01 to 10 wt. % catalyst.

15. The process of claim 9 wherein the emulsion additionally contains a phenol/formaldehyde resin and/or urea/formaldehyde resin and/or melamine/formaldehyde resin.

16. A process for the production of multi-layered boards or shaped articles composed of veneers and middle layers of strips and bars or small rods comprising:
   (a) applying the aqueous emulsion of claim 1 to the veneers and
   (b) pressing these veneers to the middle layers which middle layers are bonded together with a urea/formaldehyde resin and/or a melamine/formaldehyde resin and/or a phenol/formaldehyde resin.

17. The process of claim 16 wherein the outer layers are bonded with a urea/formaldehyde resin and/or melamine/formaldehyde resin and/or a phenol/formaldehyde resin in combination with the aqueous emulsion.

18. The process of claim 17 wherein the middle layers are bonded with the aqueous emulsion in combination with a urea/formaldehyde resin and/or a melamine/formaldehyde resin and/or a phenol/formaldehyde resin.

* * * * *